United States Patent [19]

Gulezian

[11] 4,386,677

[45] Jun. 7, 1983

[54] SAWBUCK WITH JUXTAPOSED PLATES JOURNALLED ON AN AXLE

[76] Inventor: Walter W. Gulezian, 389 Andover St., Georgetown, Mass. 01833

[21] Appl. No.: 274,407

[22] Filed: Jun. 17, 1981

[51] Int. Cl.[3] ........................ B27B 21/00; F16M 11/00

[52] U.S. Cl. .................................... 182/154; 182/181; 182/225; 108/118; 248/164; 269/296

[58] Field of Search ................ 182/154, 153, 181-186, 182/224-227; 108/118; 248/164; 269/296

[56] References Cited

U.S. PATENT DOCUMENTS

| | | | |
|---|---|---|---|
| 808,940 | 1/1906 | Meisel | 182/154 |
| 930,394 | 8/1909 | Bourgeois | 248/164 |
| 1,104,103 | 7/1914 | Carpenter | 182/154 |
| 1,523,663 | 1/1925 | Slama | 182/154 |
| 2,957,736 | 10/1960 | Olander | 248/164 |
| 3,157,136 | 11/1964 | Moody | 108/118 |
| 3,704,674 | 12/1972 | Johnson | 108/118 |
| 4,133,412 | 1/1979 | Hildebrandt | 182/154 |

*Primary Examiner*—Reinaldo P. Machado
*Attorney, Agent, or Firm*—Pearson & Pearson

[57] ABSTRACT

A rigid sawbuck assembly to be supported by four lengths of lumber such as 2×4's which form foldable "X" shaped legs. An elongated axially extending cross bar axle extends between two pairs of juxtaposed metal plates, a pair of which are at each opposite end thereof, journalled on said pipe for rotation. The plates are attached to the lengths of lumber and include lugs on the inner plates of each pair extending from the side edge into the path of rotation of the side edge of the outer plate of each pair to serve as a stop. A cross brace is attached between the lower portions of the innermost legs so that said sawbuck is rigid, foldable, compact and can be stored. Because of the flat plate structure, 2×6's or other sizes of lumber may be used for the legs.

7 Claims, 5 Drawing Figures

Fig.1.
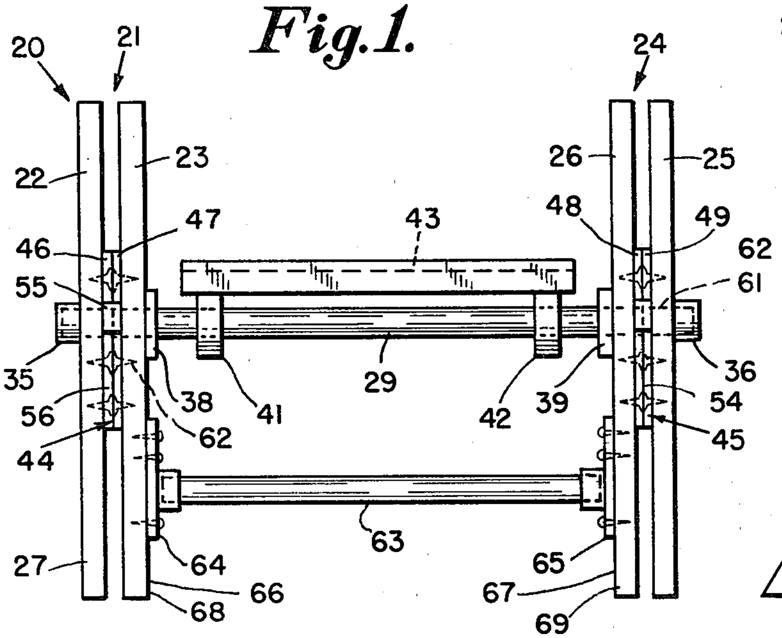
Fig.2.
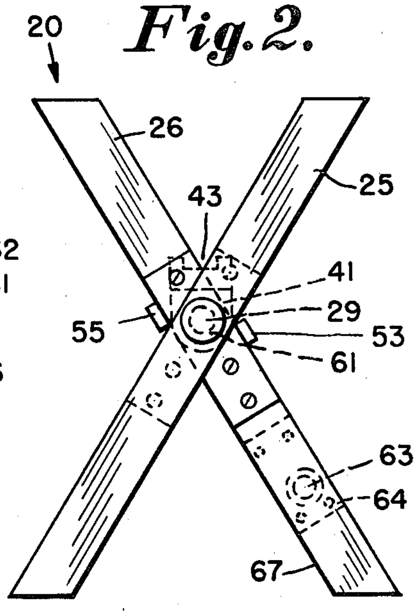
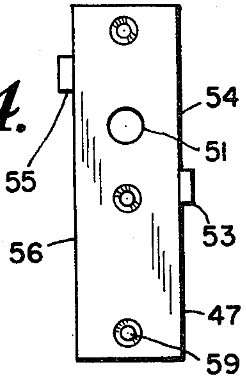
Fig.4.
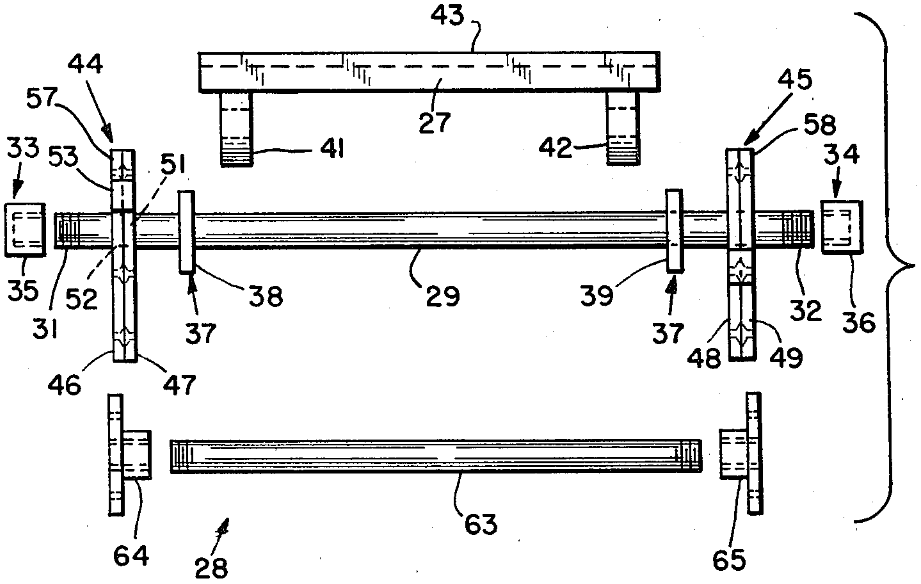
Fig.3.
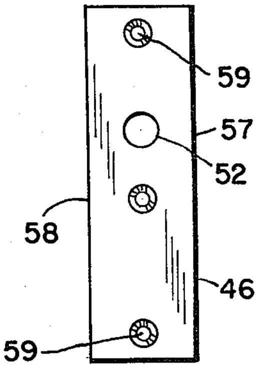
Fig. 5.

SAWBUCK WITH JUXTAPOSED PLATES JOURNALLED ON AN AXLE

BACKGROUND OF THE INVENTION

Sawbucks with "X" shaped legs and sawbuck kits for building the same have been proposed for supporting logs, or other objects for cutting, etc.

U.S. Pat. No. 1,523,663 to Slama of Jan. 20, 1925 discloses two pairs of "X" shaped legs of an ironing board held together by a threaded axial bolt and a, cam-like clamping collar and wing nut. Such a clamping device might collapse if a heavy object, such as a log, were placed on the upper portions of the "X" shaped legs.

Another example of the prior art is revealed in an article on page 187 of the October, 1980 Popular Mechanics magazine entitled "PMs sawbuck handles the long logs", wherein the sawbuck depends on the clamping pressure of carriage bolts and wing nuts at each end. There is no cross bar axle between the pairs of the legs and cross rigidity is obtained by cross braces of wood projecting from the legs.

Commercially available from the Stanley Works, New Britain, Connecticut, is hardware consisting of a pair of brackets into which lengths of lumber are inserted to form an "X" shaped sawbuck. Each bracket consists of a pair of back-to-back channel members pivoted to each other by annular slots, annular lips and stop pins in the slots.

Exemplary of such a sawbuck is the structure depicted in U.S. Pat. No. 4,133,412 to Hildebrandt of Jan. 9, 1979.

Like the above mentioned Popular Mechanics sawbuck, the Hildebrandt device uses wood cross pieces and has no cross bar axle. The legs are limited to 2×4's with the brackets shown because a larger cross section would not fit in the channels.

SUMMARY OF THE INVENTION

In this invention an unusually rigid, sawbuck is achieved, one which folds compactly to no thicker than the thickness of the legs and one which can use as legs four identical lengths of lumber of nearly any suitable cross section. It also is so constructed that there is no dependence on clamping pressure to maintain the device erect in use and no dependence on bulky exterior cross braces, or stops, of wood from which the nails might pull out under the weight of a heavy log.

Instead, the hardware from which the rigid sawbuck is assembled includes an elongated cross bar axle of metal, two pairs of back-to-back, flat, planar, metal plates, each pair near an opposite end of the axle and journalled for rotation thereon, threaded end caps on the axle, and collars welded to the axle at a spaced distance from the end caps.

Four lengths of lumber of any cross section, such as 2"×4", 2"×6", etc. are used, each affixed to one of the plates to form one of the x shaped legs. Each inside plate of each pair has at least one integral lug on its edge projecting into the path of rotation of the other plate of the pair to serve as a positive stop for the juxtaposed plates.

Instead of wood cross braces on the outside of the legs, as in prior devices, an elongated metal cross brace extends between a pair of brace plates, each on the inside of the lower portion of the inside legs of each pair.

The cross brace allows the sawbuck legs to be completely flush with each other when collapsed and, therefore, the sawbuck can be transported and stored more compactly than prior devices.

The sawbuck also includes a set of brackets affixed to the central portion of the axle for securing an upward opening trough for supporting a log being cut.

BRIEF DESCRIPTION OF THE DRAWING

FIG. 1 is a front elevational view of the sawbuck of the invention in open upright position;

FIG. 2 is a side elevational view thereof;

FIG. 3 is an exploded view of the hardware of the invention, from which the sawbuck may be constructed;

FIG. 4 is a side elevational view of an inside plate of a pair showing the lugs; and FIG. 5 is a side elevational view of the outside plate of a pair which is devoid of lugs.

DESCRIPTION OF A PREFERRED EMBODIMENT

As shown in the drawing, a rigid, compact, foldable, sawbuck 20 of the invention includes a pair of legs 21 consisting of an outer leg 22 and an inner leg 23 and a pair of legs 24 consisting of an outer leg 25 and an inner leg 26. The legs 22, 23, 25 and 26 are preferably of two by four standard lumber 27 but because of the novel plate construction of the device they may be of two by six or of various other cross sections of lumber readily available to the householder at retail lumber yards.

To form the X shaped, foldable legs and rigid construction of the sawbuck 20, the hardware 28, shown in FIG. 3, is provided.

Hardware 28 includes an elongated, metal, pipe-like, axle, or cross bar, 29 which can be a commercially available hollow steel pipe about one inch in diameter and about three feet in length. Axle 29 is threaded at each opposite end 31 and 32 for lock means 33 and 34 preferably in the form of removable threaded caps 35 and 36.

Collar means 37 is provided on axle 29 in the form of a pair of collars 38 and 39 each affixed to the axle, preferably by welding, at a spaced distance inwardly from their adjacent threaded cap 35 or 36.

Hardware 28 preferably also includes a pair of brackets 41 and 42, each affixed to axle 29 by welding or other suitable means, at a spaced distance inwardly of the adjacent collar 38 or 39. Brackets 41 and 42 support by suitable screws an upward opening trough 43 of lumber 27, for supporting short lengths of logs to be cut in the sawbuck 20.

Two pairs 44 and 45 of flat, planar, metal plates 46 and 47 and 48 and 49 are provided with hardware 28, each plate having an axle hole such as at 51, or 52, by which the plates are journalled for rotation on axle 29 in back to back, juxtaposed, relationship. As shown in FIG. 4, each inner plate 47 or 48, of each pair of plates, is provided with at least one outwardly projecting, integral, lug 53, on its side edge 54 and preferably a second such integral lug 55 on its opposite side edge 56. The lugs 53 and 55 rotate in arcuate paths which intercept the corresponding side edges 57 and 58 of the juxtaposed plate of the pair to serve as stops at the desired X shaped configuration of the legs of the sawbuck 20.

Suitable screw holes 59 are provided in each flat, planar plate 46, 47, 48 and 49 by which the juxtaposed, back to back plates may be affixed to the two by four lengths of lumber forming the legs 22, 23, 24 and 25 of sawbuck 20. Each leg is provided with a hole 61, for the axle 29 by suitable drilling, and the screw holes 59 are countersunk for screws 62 in order not to interfere with the pivoting of the plates.

Hardware 28 also includes a cross brace 63, preferably a hollow metal pipe, affixed at each end by one of a pair of flanged bases 64 or 65 to the lower portions 66 or 67 of the inside faces 68 or 69 of the inside legs 23 and 26 to extend therebetween without projecting therefrom.

In operation, it will be seen that the hardware 28 may be sold as a kit, with or without the metal pipes 29 or 63, the various caps, collars, brackets and bases being affixed by setscrews, threaded clamps, bolts or the like and the legs formed of 2"×4", 2"×6" or other suitable, available lengths of lumber to form a rigid sawbuck capable of supporting heavy logs, but foldable into a compact package no wider than the overall width of the lumber of the legs.

I claim:

1. Hardware for assembling a rigid saw buck from four lengths of 2"×4" lumber adapted to form two pairs of "X" shaped, foldable legs said hardware comprising:

an elongated metal pipe-like cross bar axle of predetermined length having a pair of removable lock means, each at an opposite end thereof and having a pair of collars each fixed thereon at a spaced distance inwardly from one of said lock means;

two pairs of elongated flat, planar metal plates, each pair at an opposite end of said metal pipe cross bar axle between one of said lock means and one of said collars, and having registering holes therein journalled on said axle for rotation thereon;

the two plates of each said pair being juxtaposed to each other and the inside plates of each said pair having at least one integral lug extending from at least one side edge thereof into the path of rotation of the outer plate of the pair to serve as a stop when said plates are in "X" configuration;

said plates each having screw holes for screws for attaching each of said plates near the top of one of said lengths of lumber; and at least one cross brace adapted to extend axially between the lower portions of the two said lengths which are attached to the inside plates of each pair.

2. Hardware as specified in claim 1 wherein:

the opposite ends of said elongated metal, pipe-like cross bar axle are threaded; and said removable lock means comprises a pair of threaded caps, each threaded on one of the ends of said axle.

3. Hardware as specified in claim 1 wherein:

each said inside plate of each pair of flat planar plates includes one of said integral lugs projecting into the rotational path of the outer plate of the pair on each opposite side edge thereof.

4. Hardware as specified in claim 1 wherein:

the outer plates of each pair of plates are free of lugs and the inner plates of each pair, each have a pair of lugs, each on an opposite side edge thereof and at different heights thereon.

5. Hardware as specified in claim 1 plus:

a pair of brackets affixed to the central portion of said cross bar axle; and an upward opening trough extending axially between said brackets and supported on said brackets.

6. Hardware as specified in claim 1 wherein:

said cross brace is a metal pipe with a flanged base at each opposite end thereof adapted to be affixed to the lower portion of the inside face of the inner legs by screws.

7. A rigid saw buck having a pair of foldable "X" shaped legs at each opposite end thereof, said sawbuck comprising:

a metal pipe, cross bar axle having two pairs of flat, planar metal plates journalled, each proximate an opposite end of said axle, for rotation thereon;

the two plates of each pair being juxtaposed and each plate of each pair being affixed to a length of 2"×4" lumber near the top thereof to form said "X" shaped legs;

one plate of each pair having at least one integral lug projecting from the edge thereof into the path of rotation of the other plate of the pair as a stop when the plates of the pair are in "X" configuration;

collar means on said axle for maintaining said plates and legs at a predetermined distance apart; and lock means at the opposite ends of said axle for retaining said plates and legs on said axle.

* * * * *